Patented Feb. 23, 1954

2,670,341

UNITED STATES PATENT OFFICE 2,670,341

PRODUCTION OF ALCOHOL-MODIFIED UREA-FORMALDEHYDE RESINS

Jack D. Joffe, Hopewell, Va., assignor to Allied Chemical & Dye Corporation, New York, N. Y., a corporation of New York No Drawing. Application October 19, 1951, Serial No. 252,200

9 Claims. (Cl. 260—70)

This invention relates to the production of alcohol-modified urea-formaldehyde resins, and more particularly to the production of alcohol-modified urea-formaldehyde resins from concentrated urea-formaldehyde reaction products.

The concentrated urea-formaldehyde reaction products which comprise the intermediate products of this invention are liquid, non-resinous compositions having 60% to 90% by weight total solids (i. e. urea plus formaldehyde), a mol ratio of 4.0 to 6.5 mols of formaldehyde for every mol of urea and a pH of at least 7.0.

An object of this invention is to prepare alcohol-modified urea-formaldehyde resins suitable for use in surface coatings and the like from the aforementioned liquid, non-resinous urea-formaldehyde reaction products. Other objects of the invention will appear hereinafter.

It has been known to prepare alcohol-modified urea-formaldehyde resins from concentrated urea-formaldehyde reaction products. For example, in U. S. P. 2,350,894 a urea-formaldehyde reaction product is prepared by reacting one mol of urea with at least 2.5 mols of formaldehyde in an alkaline, neutral, or only slightly acidic medium at temperatures between 60° and 100° C. until nearly all the formaldehyde is bound, and subjecting the reaction mixture to vacuum distillation until a syrupy condensation product practically free from water is obtained. The condensation product so produced is then heat treated with an alcohol at a pH of 5.0 to 6.0, the water still present and formed during this treatment being removed by further distillation. Also, in U. S. P. 2,322,979 an anhydrous urea-formaldehyde condensation product is etherified with an alcohol at a pH of 5.0 to 6.0.

I have made attempts to prepare alcohol-modified urea-formaldehyde resins from the intermediate products described above at a pH of 5.0 to 6.0 in accordance with the disclosures of U. S. Patents 2,350,894 and 2,322,979. By this method, however, strong tendency to produce solid resin was demonstrated by formation of solid during reaction of urea-formaldehyde reaction product with alcohol or during removal of water from the alcohol-modified resin. The extent of solid formation ranged from complete solidification of the material being processed to development of a cloudy product. Either phenomenon is highly undesirable in alcohol-modified urea-formaldehyde reaction products intended for use as coating materials.

Since it is well known that as a general class urea-formaldehyde reaction products tend to solidify when made strongly acidic, it appeared doubtful that the highly concentrated urea-formaldehyde reaction products mentioned above could be converted by alcohol-modification to high grade coating resins. It would be expected that use during alcohol-modification of pH values lower than proposed by the above-mentioned patents would certainly result in production of solid product. Contrary to expectation, I have succeeded in producing from such concentrated urea-formaldehyde reaction products alcohol-modified resins characterized by high degree of clarity and eminently suitable for use as components of coating compositions. Surprisingly enough, I have discovered that it is impossible to produce such clear resinous products unless the alcohol-modification step is conducted upon the concentrated urea-formaldehyde product in quite strongly acid condition. Specifically, the desired reaction and clear product are not realized unless the pH value obtaining at the beginning of the reaction with alcohol is 4.1 or less.

I have further found that the most desirable pH range for carrying out the reaction of my process lies between 2.5 and 4.0, the resulting product being more highly resinified as the pH value decreases.

In accordance with my invention, a liquid non-resinous urea-formaldehyde reaction product having 60% to 90% total solids, a mol ratio of 4.0 to 6.5 mols of formaldehyde for every mol of urea and a pH of at least 7.0, is adjusted to a pH of not over 4.1, preferably to a pH between 2.5 and 4.0, and a monohydric alcohol is added thereto. The resulting mixture consisting of 2 layers is heated, preferably under reflux, to obtain a clear homogeneous solution which is then concentrated by distillation under vacuum or at atmospheric pressure until a substantially dehydrated resin is obtained.

Although any liquid, non-resinous urea-formaldehyde reaction product having the composition called for above may be suitably employed as the intermediate product in my process, I prefer to use a liquid, non-resinous urea-formaldehyde reaction product having 60% to 90% total solids, a mol ratio of 4.0 to 6.5 mols of formaldehyde for every mol of urea and a pH of at least 8.0.

Any appropriate acidic substances such as phosphoric acid, an acid ester such as an organic ester of phosphoric acid or an acid salt such as ammonium chloride may be employed to bring about the desired change in pH of the intermediate product.

Generally, I prefer to combine with the intermediate products saturated monohydric alcohols containing from 1 to 8 carbon atoms, but other monohydric alcohols may also be employed. Especially suitable is n-butanol since the recovery thereof from the distillate formed during the concentration step is facilitated by the fact that n-butanol is not miscible in all proportions with water so that a layer of water separates from the initial fractions of the distillate and may be discarded. A caprylated resin may be conveniently prepared by treating an alcoholated (e. g. methylated or butylated) urea-formaldehyde reaction product with capryl alcohol during the concentration step.

The alcohol:intermediate product ratio employed affects the type of resin produced and may be varied depending upon the particular type of resin desired or required. The properties of the resins produced may also be controlled by varying the rate, temperature and extent of alcohol removal during the concentration step.

I have found that resins particularly suitable for use in surface coatings are obtainable if, subsequent to the formation of the clear homogeneous solution by reaction of intermediate product and alcohol and prior to the concentration of such solution, the formaldehyde:urea mol ratio is adjusted to about 3:1 by the addition of urea.

The alcohol-modified urea-formaldehyde resins of my invention are generally miscible with alcohols and with aromatic hydrocarbons such as xylene and have a limited tolerance of straight-chain hydrocarbons. When spread upon metal, they can be cured to clear hard coatings. If desired, they may be used in conjunction with alkyd resins for a wide variety of coating purposes.

A typical liquid, non-resinous urea-formaldehyde reaction product, suitable as intermediate product in my process, may be prepared as follows:

To a 37% by weight aqueous solution of formaldehyde substantially free from methanol, sufficient sodium hydroxide solution is added to neutralize the free acid and increase the pH of the formaldehyde solution to about 8.65. To the alkaline formaldehyde solution there is added and dissolved therein sufficient urea to provide 4.6 mols of formaldehyde for every one mol of urea. The reaction mixture thus prepared having a pH of about 8.9 to 9.0 is maintained at 30° C. for ½ hour and is then concentrated by simple batch distillation under a pressure below atmospheric of 50 mm. Hg. The distillation vessel employed for this evaporation is heated sufficiently to drive over as the overhead distillation vapors about 42% of the still charge in a period of about 95 minutes. The material thus distilled is concentrated until the still residue contains about 75.1% by weight total solids in a mol ratio of formaldehyde:urea of 4.12:1 and has a pH of 8.52.

The following examples will further illustrate how my invention may be carried out and practiced, but it will be understood that the invention in its broadest aspects is not restricted to these examples. In the examples parts are by weight:

*Example 1.*—100 parts of liquid, non-resinous urea-formaldehyde reaction product having 74.36% total formaldehyde and urea, a mol ratio of 4.7:1 formaldehyde:urea and a pH of 8.2, were adjusted to a pH of 3.4 with dilute phosphoric acid. To this solution were added 200 parts of n-butanol, and the mixture consisting of two layers was heated to form a perfectly clear homogeneous solution. The formaldehyde:urea ratio was adjusted to 3:1 by the addition of 12.5 parts of urea, and the solution was boiled under reflux for 1½ hours. All of the water and a portion of the n-butanol were removed by distillation at atmospheric pressure over a 40 minute period until the temperature rose to 135° C. The residual resin constituted 143 parts and had an unlimited tolerance of xylene and a high tolerance of petroleum ether. When it was coated on a steel plate and cured at 150° C. for 50 minutes, a fairly hard coating was obtained.

*Example 2.*—100 parts of liquid, non-resinous urea-formaldehyde reaction product having 85.3% total formaldehyde and urea, a mol ratio of 4.4:1 formaldehyde:urea and a pH between 8.0 and 8.5, were adjusted to a pH of 3.5 with dilute phosphoric acid. To this solution were added 200 parts of n-butanol, and the mixture consisting of two layers was heated to form a perfectly homogeneous solution. The formaldehyde:urea ratio was adjusted to 3:1 by the addition of urea, and the solution was refluxed for 1½ hours. All of the water and part of the butanol were removed by distillation at atmospheric pressure over a period of 1½ hours until the temperature rose to about 150° C. The residual resin constituting 129 parts was clear and had an unlimited tolerance of xylene and a 3:1 tolerance of petroleum ether. When the resin was coated on a steel plate and cured at 150° C. for 1 hour, a hard coating was obtained.

*Example 3.*—100 parts of the liquid, non-resinous urea-formaldehyde reaction product described in Example 1 were adjusted to a pH of 2.8 with dilute phosphoric acid. 200 parts of isobutyl alcohol were added, and the mixture was heated until a clear homogeneous solution formed. The formaldehyde:urea mol ratio was adjusted to 3:1 by the addition of 12.5 parts of urea, and the solution was refluxed for ½ hour. All of the water and part of the isobutanol were distilled at atmospheric pressure for 1¼ hours until the temperature rose to 130° C. The residual resin constituting 127 parts was more viscous than the resin formed in Example 1. When cured on a slide at 150° C. for 1 hour, a hard coating was obtained.

*Example 4.*—100 parts of the intermediate product described in Example 1 were adjusted to a pH of 4.1 with dilute phosphoric acid. 81 parts of n-butyl alcohol were added, and the resulting mixture was heated until a clear homogeneous solution formed. The formaldehyde:urea ratio was adjusted to 3:1. The solution was then concentrated at atmospheric pressure for 40 minutes until the temperature rose to 115° C. A clear resin constituting 124 parts and having a 3:1 tolerance of xylene and 1:4 tolerance of petroleum ether was formed. When cured at 150° C. for 1 hour, a very hard mar-proof coating resulted.

*Example 5.*—25 parts of liquid, non-resinous urea-formaldehyde reaction product having 83.1% total formaldehyde and urea, 4.14:1 formaldehyde:urea mol ration and a pH of 8.2, were adjusted to a pH of 2.7 with dilute phosphoric acid. The formaldehyde:urea mol ratio was adjusted to 3:1 with 2.6 parts of urea. 81 parts of methyl alcohol were added, and the resulting solution was heated to 50° C. 41 parts of capryl alcohol were then added and the solution heated until the temperature rose to 165° C. A clear caprylated urea-formaldehyde resin was thus produced.

*Example 6.*—500 parts of the intermediate product described in Example 5 were adjusted to a pH of 3.6. 1010 parts of n-butanol were added, and the mixture was heated to boiling to form a complete solution. The formaldehyde:urea ratio was adjusted to 3:1 with 52 parts of urea. The solution was refluxed for 1½ hours at 90° C. and was then distilled at 135 mm. Hg pressure and then at 85 mm. Hg pressure until the temperature rose to 107° C. A clear and viscous resin constituting 600 parts and having an unlimited tolerance of xylene and a 1:1 tolerance of petroleum ether was obtained. After mixing with 30% by weight of xylene, it formed a hard and adherent coating when spread upon a metal plate and cured 15 minutes at 150° C.

The following examples illustrate unsuccessful preparation of resins at pH values higher than the maximum of 4.1 as called for by the process of this invention and emphasize the criticality of pH conditions in my process:

*Example 7.*—100 parts of liquid, non-resinous urea-formaldehyde reaction product having 74.36% total formaldehyde and urea, a mol ratio of 4.7 mols of formaldehyde to 1 mol of urea and a pH of 8.2, were adjusted to a pH of 5.5 with dilute phosphoric acid. 200 parts of n-butanol were added, and the resulting mixture consisting of two layers was heated until only one layer remained. Some solid was formed during the reaction thus rendering the product objectionable as a coating resin.

*Example 8.*—100 parts of the intermediate product described in Example 7 were adjusted to a pH of 4.5 with dilute phosphoric acid. 200 parts of n-butanol were added, and the resulting mixture consisting of two layers was heated until only one layer remained. The formaldehyde:urea mol ratio was adjusted to 3:1 by the addition of 12.5 parts of urea, and the solution was boiled under reflux for 1½ hours and then distilled at atmospheric pressure over a 40 minute period until the temperature rose to 135° C. Upon cooling, the material turned solid. This solidification is clearly objectionable in a coating resin.

*Example 9.*—100 parts of liquid, non-resinous urea-formaldehyde product having 83.1% total formaldehyde and urea, a mol ratio of 4.1 mols of formaldehyde to 1 mol of urea and a pH of 8.0, were adjusted to a pH of 5.3 with dilute phosphoric acid. 81 parts of n-butanol alcohol were added, and the mixture was heated to produce a clear homogeneous solution. The formaldehyde:urea mol ratio was adjusted to 3:1 by the addition of 10.4 parts of urea, and the resulting solution was distilled at atmospheric pressure for 40 minutes until the temperature rose to 115° C. The resin produced which constituted 122 parts became very cloudy upon cooling. Furthermore, it formed a precipitate upon the addiiton of butanol and could not be mixed with xylene.

I claim:

1. A process for the preparation of alcohol-modified urea-formaldehyde resins which comprises heat reacting a liquid, non-resinous, aqueous urea-formaldehyde reaction product which has been prepared under alkaline conditions and has 60% to 90% by weight total solids, a mol ratio of 4.0 to 6.5 mols of formaldehyde to 1 mol of urea and a pH of at least 7.0, with a saturated unsubstituted monohydric alcohol containing from 1 to 8 carbon atoms at a pH of not over 4.1.

2. A process for the preparation of alcohol-modified urea-formaldehyde resins which comprises heat reacting a liquid, non-resinous, aqueous urea-formaldehyde reaction product which has been prepared under alkaline conditions and has 60% to 90% by weight total solids, a mol ratio of 4.0 to 6.5 mols of formaldehyde to 1 mol of urea and a pH of at least 7.0, with a saturated unsubstituted monohydric alcohol containing from 1 to 8 carbon atoms at a pH of not over 4.1, and subjecting the resulting reaction mixture to distillation until a substantially dehydrated resin of the desired viscosity is obtained.

3. A process for the preparation of alcohol-modified urea-formaldehyde resins which comprises heat reacting a liquid, non-resinous, aqueous urea-formaldehyde condensation product which has been prepared under alkaline conditions and has 60% to 90% by weight total solids, a mol ratio of 4.0 to 6.5 mols of formaldehyde to 1 mol of urea and a pH of at least 7.0, with a saturated unsubstituted monohydric alcohol containing from 1 to 8 carbon atoms at a pH of 2.5 to 4.0, and subjecting the resulting reaction mixture to distillation until a substantially dehydrated resin of the desired viscosity is obtained.

4. A process for the preparation of alcohol-modified urea-formaldehyde resins which comprises heat reacting a liquid, non-resinous, aqueous urea-formaldehyde condensation product which has been prepared under alkaline conditions and has 60% to 90% by weight total solids, a mol ratio of 4.0 to 6.5 mols of formaldehyde to 1 mol of urea and a pH of at least 8.0, with a saturated unsubstituted monohydric alcohol containing from 1 to 8 carbon atoms at a pH of 2.5 to 4.0, and subjecting the resulting reaction mixture to distillation until a substantially dehydrated resin of the desired viscosity is obtained.

5. A process for the preparation of alcohol-modified urea-formaldehyde resins which comprises heat reacting a liquid, non-resinous, aqueous urea-formaldehyde condensation product which has been prepared under alkaline conditions and has 60% to 90% by weight total solids, a mol ratio of 4.0 to 6.5 mols of formaldehyde to 1 mol of urea and a pH of at least 7.0, with a saturated unsubstituted monohydric alcohol containing from 1 to 8 carbon atoms at a pH of 2.5 to 4.0 until a clear homogeneous solution is obtained, adding urea to reduce the formaldehyde:urea mol ratio to about 3:1, and subjecting the resulting reaction mixture to distillation until a substantially dehydrated resin of the desired viscosity is obtained.

6. A process for the preparation of alcohol-modified urea-formaldehyde resins which comprises heat reacting a liquid, non-resinous, aqueous urea-formaldehyde reaction product which has been prepared under alkaline conditions and has 60% to 90% by weight total solids, a mol ratio of 4.0 to 6.5 mols of formaldehyde to 1 mol of urea and a pH of at least 8.0, with a saturated unsubstituted monohydric alcohol containing from 1 to 8 carbon atoms at a pH of not over 4.1 until a clear homogeneous solution is obtained, adding urea to reduce the formaldehyde:urea mol ratio to about 3:1, and subjecting the resulting reaction mixture to distillation until a substantially dehydrated resin of the desired viscosity is obtained.

7. The process according to claim 6 wherein the alcohol is n-butanol.

8. A process for the preparation of alcohol-modified urea-formaldehyde resins which comprises heat reacting a liquid, non-resinous, aqueous urea-formaldehyde condensation product which has been prepared under alkaline conditions and has 60% to 90% by weight total solids, a mol ratio of 4.0 to 6.5 mols of formaldehyde to 1 mol of urea and a pH of at least 8.0, with a saturated unsubstituted monohydric alcohol containing from 1 to 8 carbon atoms at a pH of 2.5 to 4.0 until a clear homogeneous solution is obtained, adding urea to reduce the formaldehyde:urea mol ratio to about 3:1, and subjecting the resulting reaction mixture to distillation until a substantially dehydrated resin of the desired viscosity is obtained.

9. The process according to claim 8 wherein the alcohol is n-butanol.

JACK D. JOFFE.

References Cited in the file of this patent

UNITED STATES PATENTS

| Number | Name | Date |
|---|---|---|
| 2,322,979 | Siegel | June 29, 1943 |
| 2,350,894 | Honel | June 6, 1944 |

FOREIGN PATENTS

| Number | Country | Date |
|---|---|---|
| 616,463 | Great Britain | Jan. 21, 1949 |